(12) United States Patent
Oh et al.

(10) Patent No.: US 7,751,500 B2
(45) Date of Patent: Jul. 6, 2010

(54) METHOD OF SELECTING DEMODULATION SCHEME AND DIGITAL BROADCAST RECEIVER USING THE SAME

(75) Inventors: Keum-yong Oh, Suwon-si (KR);
Gyung-pyo Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1245 days.

(21) Appl. No.: 11/194,684

(22) Filed: Aug. 2, 2005

(65) Prior Publication Data

US 2006/0029159 A1     Feb. 9, 2006

(30) Foreign Application Priority Data

Aug. 6, 2004  (KR) ..................... 10-2004-0062089

(51) Int. Cl.
*H04L 27/00* (2006.01)
(52) U.S. Cl. .................. 375/324; 375/316; 375/219; 375/295; 455/73; 370/241; 370/252
(58) Field of Classification Search ............... 375/324, 375/316, 219, 295; 455/73; 370/241, 252
See application file for complete search history.

(56) References Cited

U.S. PATENT DOCUMENTS

| | | | |
|---|---|---|---|
| 7,298,784 B2 | 11/2007 | Matsusaka | |
| 2002/0056140 A1 | 5/2002 | Oishi et al. | |
| 2002/0197973 A1* | 12/2002 | Yoshimoto | 455/303 |
| 2002/0199210 A1* | 12/2002 | Shi et al. | 725/144 |
| 2004/0081260 A1* | 4/2004 | Matsusaka | 375/340 |
| 2006/0033838 A1* | 2/2006 | Choi | 348/441 |

FOREIGN PATENT DOCUMENTS

| | | |
|---|---|---|
| CN | 1499800 A | 5/2004 |
| JP | 11239192 A | 8/1999 |
| JP | 2000-209457 A | 7/2000 |
| JP | 2000-332578 A | 11/2000 |
| JP | 2001136146 A | 5/2001 |
| JP | 2001274769 A | 10/2001 |
| JP | 2002204405 A | 7/2002 |
| JP | 2003-219310 A | 7/2003 |
| KR | 2002-0005065 A | 1/2002 |
| KR | 2002-0079968 A | 10/2002 |
| KR | 2003-0027233 A | 4/2003 |
| KR | 10-2004-0010115 A | 1/2004 |

* cited by examiner

*Primary Examiner*—David C Payne
*Assistant Examiner*—Zewdu Kassa
(74) *Attorney, Agent, or Firm*—Sughrue Mion, PLLC

(57) ABSTRACT

A method and apparatus for efficiently selecting a demodulation scheme for a particular channel in a digital broadcast receiver supporting a plurality of demodulation schemes are provided. The method includes receiving the digital broadcast signal of the channel; attempting demodulation of the digital broadcast signal using a demodulation scheme corresponding to a sequential index; and if the demodulation attempt succeeds, restoring data and if the demodulation attempt does not succeed, attempting demodulation again using a demodulation scheme corresponding to a next sequential index.

24 Claims, 12 Drawing Sheets

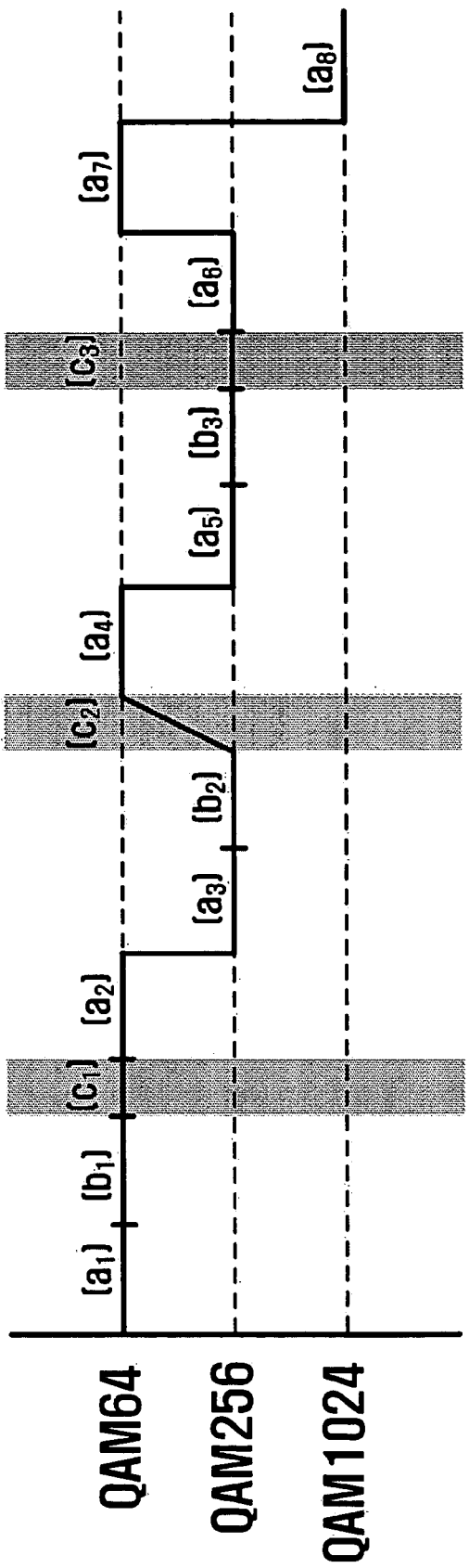

METHOD OF SELECTING DEMODULATION SCHEME AND DIGITAL BROADCAST RECEIVER USING THE SAME

CROSS-REFERENCE TO RELATED APPLICATION

This application claims priority from Korean Patent Application No. 10-2004-0062089 filed on Aug. 6, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to a digital broadcast reception, and more particularly, to efficiently selecting a demodulation scheme for a particular channel in a digital broadcast receiver supporting a plurality of demodulation schemes.

2. Description of the Related Art

A digital broadcast receiver is an apparatus that restores original digital data from a broadcast signal transmitted according to a digital transmission scheme. A digital broadcast transmitter, i.e., a broadcast station area (hereinafter, referred to as a "head end") converts an analog signal into a digital signal comprised of 0's and 1's using digital technology, compresses the converted signal together with other information, and then transmits the compressed signal according to a digital transmission scheme. Then, the digital broadcast receiver receives and converts the transmitted signal into original video and audio.

Compared to analog technology, digital technology is usually robust to noise, needs less transmission power, allows use of error correction, and has less degradation in transmission, copy, and accumulation. In addition, digital technology enables high band compression on a video/audio signal and facilitates search, processing, and editing of information. Digital broadcast using such digital technology is advantageous in that it is robust to noise and realizes efficient information transmission compared to conventional analog television (TV).

To transmit a digital broadcast signal through cable, terrestrial, or satellite propagation, modulation of a baseband signal such as an original video/audio signal is needed. Examples of digital modulation are quadrature amplitude modulation (QAM), quadrature phase shift keying (QPSK), and coded orthogonal frequency division multiplexing (COFDM). Of those, QAM is usually used for cable broadcast. Different formats of QAM, e.g., QAM64, QAM256, and QAM1024, have been commercialized. QPSK is used for a return channel in the cable broadcast. COFDM is used for terrestrial broadcast in Europe and for microwave multipoint distribution services (MMDS).

QAM is widely used in diverse fields including the field of cable broadcast. QAM uses an intermediate frequency (IF) modulation scheme of generating a QAM signal by modulating the amplitude of two quadrature carriers and two independent baseband signals. QAM is used to modulate digital information in a convenient frequency band. If the QAM scheme is used, a spectrum band taken up by a signal is matched with a pass band of a transmission line so that the signal is subjected to frequency division multiplexing or can be radiated using a small antenna. QAM is adopted by Digital Video Broadcasting (DVB), Digital Audio Visual Council (DAVIC), and Multimedia Cable Network System (MCNS) partners to transmit a digital TV signal through a coaxial cable, a Hybrid Fiber Coaxial (HFC) cable, a Microwave Multipoint Distribution System (MMDS) TV network.

The QAM scheme may be present in variable (4, 16, 32, 64, 128, 256, 512, and 1024) levels providing 2, 4, 5, 6, 7, 8, 9, and 10 Mbits/s/MHz. In this situation, a maximum of about 42 Mbits/s (QAM-256) can be provided through a United States CATV channel of 6 MHz and a maximum of 56 Mbits/s can be provided through a European CATV channel of 8 MHz.

Meanwhile, terrestrial broadcast in the United States adopts an 8-level vestigial side band (8-VSB) as a standard and has trended to a 16-level VSB (16-VSB). VSB technology is critical transmission technology for receiving a digital broadcast transmission signal and restoring compressed digital data to an original video/audio in a digital TV. The VSB technology is adopted as a terrestrial digital TV transmission standard in the United States, Canada, Korea, Taiwan, etc. Advanced Television System Committee (ATSC) has been developed from an analog system, National Television System Committee (NTSC). ATSC is a system in which NTSC is implemented in a digital mode at the same frequency bandwidth of 6 MHz as used in NTSC broadcast technology.

ATSC uses a VSB modulation scheme, in which video reception is possible if a signal level is at least 15 dB higher than a noise level when any interference signal like ghost is not present and a wide service area can be secured with small output power. In addition, ATSC is robust to impulse noise occurring in a spark-plug of an automobile or a motor of an electric fan, a drier, or the like.

A VSB system is mainly characterized by using a small pilot instead of a suppressed carrier used in QAM. The pilot is located on a Nyquist slope of an NTSC spectrum to minimize co-channel interference affecting NTSC broadcast. If there is no other channel corruption, a pilot signal can be received at a signal-to-noise ratio (SNR) of 0 dB and can also be easily received even under a poor condition like ghost or co-channel interference.

Examples of a commercialized VSB are 8-VSB and 16-VSB. While 8-VSB allows one digital broadcast program to be transmitted in a broadcast band, 16-VSB, i.e., digital cable TV transmission technology, allows two digital broadcast (i.e., HDTV) programs to be simultaneously transmitted in the same broadcast band. Accordingly, 16-VSB has been evaluated as efficient digital broadcast transmission technology in a cable TV broadcast environment.

As described above, most countries use a single designated modulation scheme (i.e., a broadcast standard) according to standards. Thus, a digital broadcast receiver performs demodulation according to a designated scheme. However, a digital broadcast standard may be different according to terrestrial, satellite, or cable propagation even in a single area. Even for terrestrial broadcast, many channels may use different modulation schemes upon occasion. In addition, a user in one area may want to receive a terrestrial or satellite broadcast signal forwarded from another area using a different standard than the user's area. As described above, when a user wants to view a plurality of broadcasts that have been modulated using different schemes on a single digital broadcast receiver, the digital broadcast receiver must have known all modulation schemes or the user needs to manually designate all of the modulation schemes. However, many broadcasting stations may use diverse modulation schemes and a single broadcasting station may use different modulation schemes according to a type of content. Accordingly, it actually may not be possible for the digital broadcast receiver to know all modulation schemes for individual broadcast signals in advance.

Therefore, if a transmitter transmits digital broadcast signals using diverse modulation schemes according to equipment characteristics, a digital broadcast receiver needs to search diverse demodulation schemes and correctly catch the broadcast signals for channels. Accordingly, a method of efficiently selecting a correct demodulation schemes for a digital broadcast signal having unknown modulation is desired.

SUMMARY OF THE INVENTION

The present invention provides a method and apparatus for efficiently selecting a demodulation scheme corresponding to a modulation scheme and demodulating a baseband signal using the found scheme, if a digital broadcast signal is transmitted using a different modulation scheme according to a physical channel.

The present invention also provides various methods of selecting the demodulation scheme.

According to an aspect of the present invention, there is provided a method of selecting a demodulation scheme in a digital broadcast receiver. The method includes receiving a digital broadcast signal of a channel; attempting demodulation of the digital broadcast signal using a demodulation scheme corresponding to a sequential index; and if the demodulation attempt succeeds, restoring data and if the demodulation attempt does not succeed, attempting demodulation again using a demodulation scheme corresponding to a next sequential index.

According to another aspect of the present invention, there is provided a method of selecting a demodulation scheme among a predetermined number of demodulation schemes supported by a digital broadcast receiver to demodulate a digital broadcast signal of a channel, the method including receiving the digital broadcast signal of the channel, attempting demodulation of the digital broadcast signal using a latest demodulation scheme performed successfully, and if the demodulation attempt succeeds, restoring data and if the demodulation attempt does not succeed, attempting demodulation again using a demodulation scheme corresponding to a next sequential index succeeding a sequential index allocated to the latest successful demodulation scheme.

According to still another aspect of the present invention, there is provided a method of selecting a demodulation scheme among a predetermined number of demodulation schemes supported by a digital broadcast receiver to demodulate a digital broadcast signal of a channel, the method including receiving the digital broadcast signal of the channel, attempting demodulation of the digital broadcast signal using a demodulation scheme having a maximum frequency of use, and if the demodulation attempt succeeds, restoring data and if the demodulation attempt does not succeed, attempting demodulation again using a demodulation scheme corresponding to a next sequential index succeeding a sequential index allocated to the latest successful demodulation scheme.

According to a further aspect of the present invention, there is provided a method of selecting a demodulation scheme among a predetermined number of demodulation schemes supported by a digital broadcast receiver to demodulate a digital broadcast signal of a channel, the method including receiving the digital broadcast signal of the channel, attempting demodulation of the digital broadcast signal using a demodulation scheme having a maximum frequency of use, and if the demodulation attempt succeeds, restoring data and if the demodulation attempt does not succeed, attempting demodulation again using a demodulation scheme having a subsequent maximum frequency of use.

According to yet another aspect of the present invention, there is provided a digital broadcast receiver which selects a demodulation scheme from among a predetermined number of demodulations schemes supported by the digital broadcast receiver, performs demodulation using the selected demodulation scheme, and restores data, the digital broadcast receiver including a signal receiving unit receiving a signal selected by a user from digital broadcast signals, a demodulation control unit selecting a demodulation scheme among the demodulation schemes supported by the digital broadcast receiver, controlling a digital demodulation unit to perform demodulation using the selected demodulation scheme, and determining whether an output signal from the digital demodulation unit has been appropriately demodulated, a digital demodulation unit demodulating the selected signal using the selected demodulation scheme in response to the control of the demodulation control unit, and a data restoring unit restoring data from the output signal from the digital demodulation unit if the output signal is determined as being appropriately demodulated.

BRIEF DESCRIPTION OF THE DRAWINGS

The above and other aspects of the present invention will become more apparent by describing in detail exemplary embodiments thereof with reference to the attached drawings in which:

FIG. 12 is a diagram for explaining the "frequency order" switching method in a specific example.

DETAILED DESCRIPTION OF EXEMPLARY EMBODIMENTS OF THE INVENTION

Figure 1:
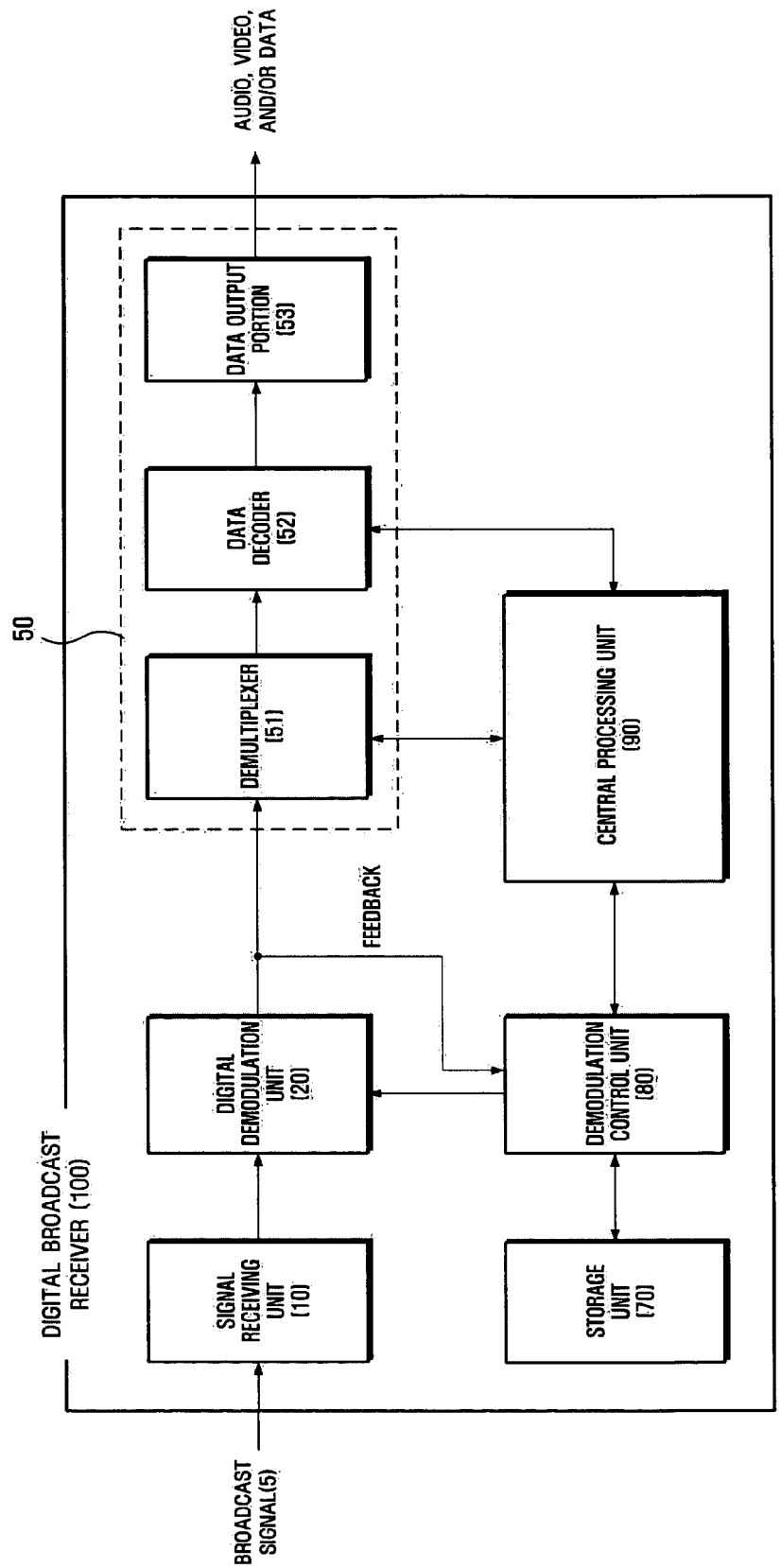
FIG. 1 is a block diagram of a digital broadcast receiver according to an exemplary embodiment of the present invention.

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Referring to FIG. 1, a digital broadcast receiver 100 according to an exemplary embodiment of the present invention includes a signal receiving unit 10, a digital demodulation unit 20, a data restoring unit 50, a central processing unit 90, a storage unit 70, and a demodulation control unit 80.

The signal receiving unit 10 receives a signal selected by a user from among broadcast signals 5 transmitted through a wired/wireless medium. The signal receiving unit 10 may include a radio frequency (RF) antenna that detects the broadcast signals 5 in the air and a tuner that selects a signal of a desired channel from among the broadcast signals 5 and converts the signal into an IF signal. If a cable broadcast signal is received, the RF antenna may be replaced with a signal input port of a cable modem. In an exemplary embodiment of the present invention, it is assumed that a signal is received through the RF antenna.

The signal receiving unit 10 provides the converted IF signal to the digital demodulation unit 20. Then, the digital demodulation unit 20 recovers a transport stream from the IF signal and provides the transport stream to the data restoring unit 50.

The operations of the signal receiving unit 10 and the digital demodulation unit 20 will be described in detail with reference to FIG. 2.

The signal receiving unit 10 may include an RF antenna 11, a tuner 12, a surface acoustic wave (SAW) filter 13, a mixer 14, and a first oscillator 15. The tuner 12 converts an RF signal (e.g., a 50-860 MHz band signal) into a first IF signal (e.g., a 44 MHz signal) and transmits the first IF signal to the SAW filter 13. The SAW filter 13 filters the first IF signal by removing an adjacent channel signal and a noise signal from the first IF signal and outputs the filtered signal to the mixer 14.

Meanwhile, the first oscillator 15 generates an oscillation frequency used for generation of a second IF signal. The mixer 14 down-converts the filtered signal received from the SAW filter 13 to the oscillation frequency of the first oscillator 15 to generate a second IF signal and outputs the second IF signal to the digital demodulation unit 20.

The digital demodulation unit 20 may include an automatic gain control (AGC) amplifier 21, an analog-to-digital (A/D) converter 22, a symbol restoring unit 23, and a second oscillator 24.

The AGC amplifier 21 compensates for the gain of the second IF signal received from the mixer 14 to make the second IF signal possible to be subjected to A/D conversion. In detail, since a signal becomes very weak after passing through the SAW filter 13, the AGC amplifier 21 compensates an output of the SAW filter 13 to have a signal gain allowing the A/D converter 22 following the AGC amplifier 21 to normally perform A/D conversion.

The second oscillator 24 generates a sampling frequency used for sampling of the second IF signal. The A/D converter 22 converts the second IF signal amplified by the AGC amplifier 21 into a digital signal using the sampling frequency generated by the second oscillator 24 and outputs the digital signal to the symbol restoring unit 23.

The symbol restoring unit 23 attempts restoring a transmitted symbol from the digital signal received from the A/D converter 22 using a demodulation scheme, such as VSB-8, VSB-16, QAM64, QAM256, QAM1024, differential phase shift keying (DPSK), or QPSK, selected by the demodulation control unit 80. If a terrestrial or cable broadcasting company transmits a digital broadcast signal, a modulation scheme like VSB or QAM may be used. VSB modulation includes 8-VSB and 16-VSB and QAM includes QAM64, QAM256, and QAM1024. In this situation, the digital broadcast receiver 100 must attempt diverse demodulation schemes corresponding to these modulation schemes when scanning channels to memorize them and attempting tuning in a channel the information of which is not present in the digital broadcast receiver 100.

If a demodulation scheme appropriate to a modulation scheme used for an input signal is selected, the symbol restoring unit 23 normally restores a transmitted symbol. However, if a demodulation scheme which is not appropriate for the modulation scheme used for the input signal is selected, the symbol restoring unit 23 cannot normally restore the transmitted symbol. For this reason, the expression "the symbol restoring unit 23 attempts restoring a transmitted symbol" is used. When the symbol restoring unit 23 attempts restoring the transmitted symbol, the digital demodulation unit 20 attempts demodulation.

Figure 3:
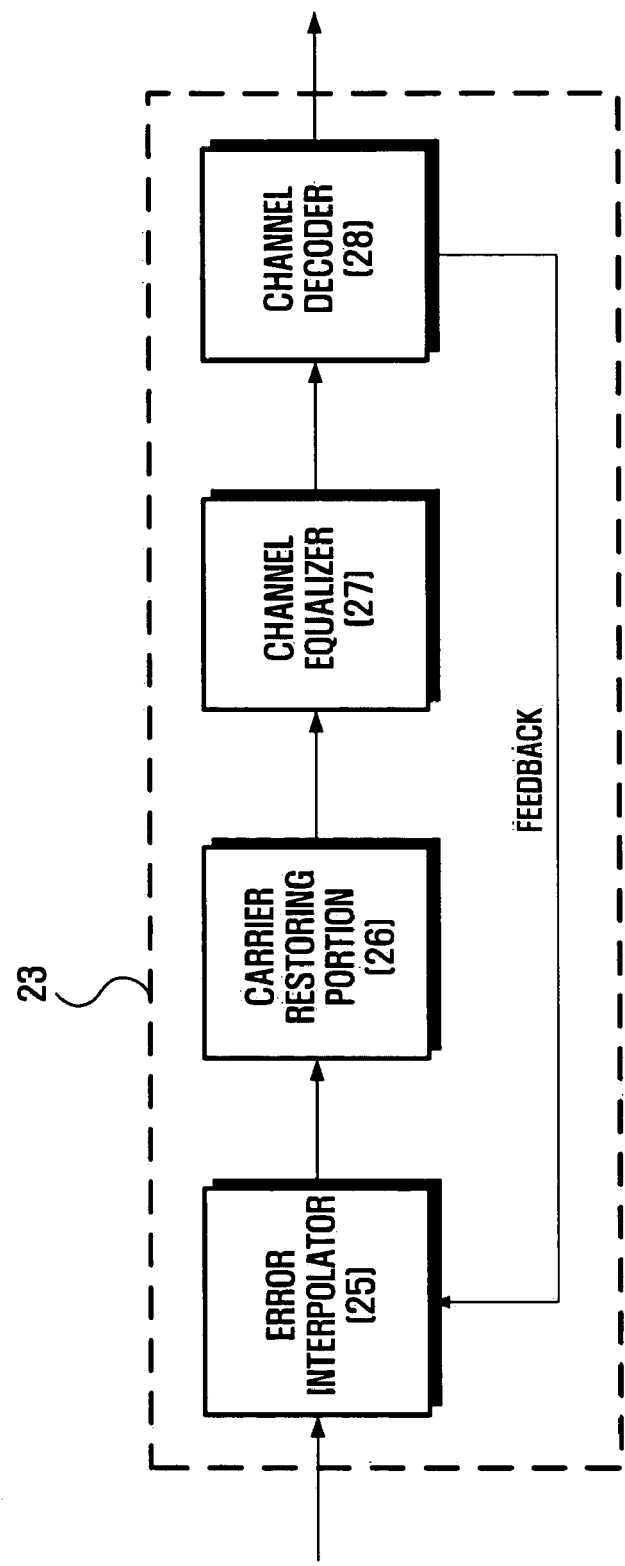
FIG. 3 is a detailed block diagram of a symbol restoring unit shown in FIG. 2.

The symbol restoring unit 23 attempts symbol restoration and outputs the result of the restoration to an outside of the digital demodulation unit 20. Referring to FIG. 3, the symbol restoring unit 23 may include an error interpolator 25, a carrier restoring portion 26, a channel equalizer 27, and a channel decoder 28.

The error interpolator 25 receives feedback of a timing error in symbols obtained from baseband signal processing, for example, in transmitted symbols that have been decoded by the channel decoder 28. In addition, the error interpolator 25 performs interpolation to reduce an error between the digital signal received from the A/D converter 22 and the timing error fed back from the channel decoder 28 and outputs the result of the interpolation to the carrier restoring portion 26.

The carrier restoring portion 26 removes frequency offset and phase jitter of a carrier, which have occurred in the tuner 12 and the mixer 14, from a band-pass digital signal, then demodulates the band-pass digital signal into a baseband digital signal, and then outputs the baseband digital signal to the channel equalizer 27.

The channel equalizer 27 removes inter-symbol interference caused by multiple paths from the baseband digital signal recovered by the carrier restoring portion 26 and outputs the baseband digital signal from which the inter-symbol interference has been removed to the channel decoder 28. In a digital transport system like HDTV, a transmitted signal may have a bit detection error in a receiver due to distortion occurring in a multi-path channel or a transmitting/receiving system or interference of a NTSC signal. In particular, signal propagation through a multi-path channel causes inter-symbol interference and is thus a major cause of the bit detection error. Accordingly, the channel equalizer 27 is used to remove the symbol interference.

The channel decoder 28 removes burst noise and sporadic noise that exist on a channel from the baseband digital signal received from the channel equalizer 27 using a Reed-Solomon coding method and a grid modulation method, restores synchronizing signals inserted during transmission from the baseband digital signal, and restores transmitted data, i.e., transmitted symbol using the synchronizing signals.

Referring back to FIG. 1, the demodulation control unit 80 selects one demodulation scheme among demodulation schemes supported by the digital broadcast receiver 100 and controls the digital demodulation unit 20 to perform demodulation using the selected demodulation scheme. In addition, the demodulation control unit 80 determines whether a signal output from the digital demodulation unit 20 has been demodulated appropriately and stores in the storage unit 70 "history information" such as an index of each demodulation scheme, an index of a successful demodulation scheme, and an accumulation of indexes of demodulation schemes to use the history information in a subsequent attempt at demodulation. The operations of the demodulation control unit 80 will be described in detail with reference to FIGS. 4 through 12 later.

A demodulated transport stream output from the digital demodulation unit 20 is restored to original data (a video signal, an audio signal, or other data) by the data restoring unit 50 and the original data is output. The data restoring unit 50 may include a demultiplexer 51, a data decoder 52, and a data output portion 53.

The demultiplexer 51 is controlled by the central processing unit 90. The demultiplexer 51 parses the transport stream received from the digital demodulation unit 20 to extract an audio signal, a video signal, or a data signal from the transport stream and provides the audio signal, the video signal, or the data signal to the data decoder 52.

The data decoder 52 may include a video decoder, an audio decoder, or a data parser and transmits demultiplexed video, audio or data signal to the data output portion 53. The data decoder 52 may be implemented according to a video decoding method such as MPEG-2 (Moving Picture Experts Group-2) or MPEG-4 (Moving Picture Experts Group-4), an audio decoding method such as MPEG Layer-3 (MP3) or Audio Compression 3 (AC-3), or a method of decoding compressed normal data.

The data output portion 53 processes and outputs the video, audio or data signal to a video output device, an audio output device, or a storage medium (not shown), respectively. For example, the data output portion 53 uses an NTSC encoder to process the video signal. In this case, the data output portion 53 decodes the video signal and outputs the decoded video signal to a video output device. Instead of the NTSC encoder, a PAL encoder may be used. In addition, the data output portion 53 may decode the audio signal using an audio decoder and a digital-to-analog (D/A) converter and output the decoded audio signal to an external audio output device. Moreover, the data output portion 53 may process the data signal and store normal data in a file format in a non-volatile memory device such as a hard disc or a flash memory device so that the stored normal data can be executed by the central processing unit 90.

The central processing unit 90 controls the entire system of the digital broadcast receiver 100 and may be implemented as a microprocessor. In the exemplary embodiment illustrated in FIG. 1 the central processing unit 90 is implemented separately but may be embedded into the demultiplexer 51 or the data decoder 52 so that the speed or the performance of the central processing unit 90 can be exclusively used.

Figure 2:
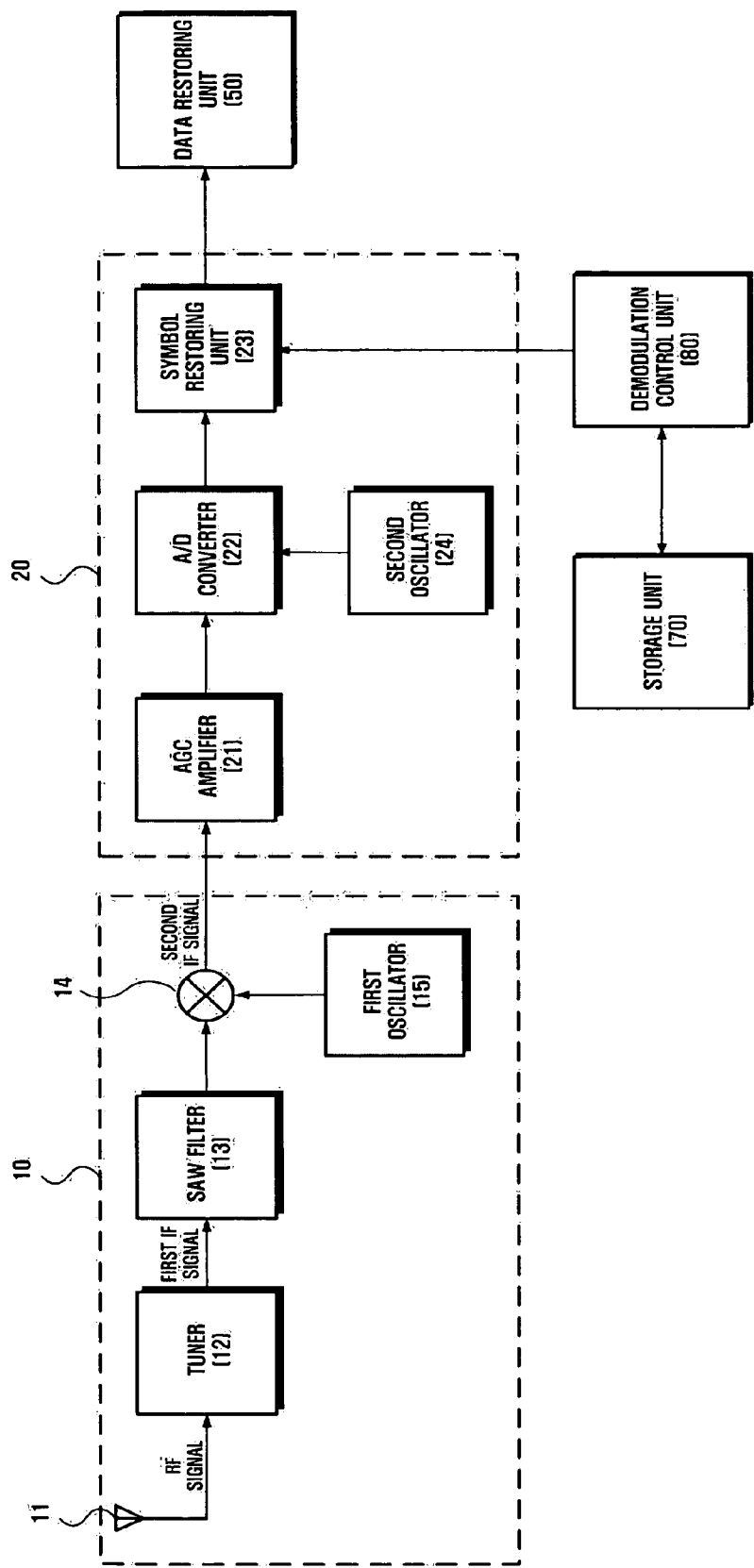
FIG. 2 is a detailed block diagram of a signal receiving unit and a digital demodulation unit shown in FIG. 1.

In the description of FIGS. 1 through 3, the term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

The present invention provides four types of methods to efficiently select a demodulation scheme corresponding to a modulation scheme used for a digital broadcast signal if diverse modulation schemes are used according to a physical channel.

A first method is a sequential switching method in which an index sequence is given to demodulation schemes available in the digital broadcast receiver 100 and then demodulation is attempted using the demodulation schemes according to the index sequence if a channel changes. A second method is a "sequential-after-the latest" switching method in which the latest successful demodulation scheme is attempted first when a channel changes and only if the attempt at the latest successful demodulation scheme ends in failure, the other demodulation schemes are attempted sequentially. A third method is a "sequential-after-maximum" switching method in which a demodulation scheme that have been successfully performed most frequently among a last predetermined number of demodulation attempts is attempted and only if the attempt at the most frequent demodulation scheme ends in failure, the other demodulation schemes are attempted sequentially. A fourth method is a "frequency order" switching method in which demodulation schemes are attempted in descending order of successful attempt frequency that indicates how often each demodulation scheme has been successfully performed in a last predetermined number of demodulation attempts.

Sequential Switching Method

Figure 4:
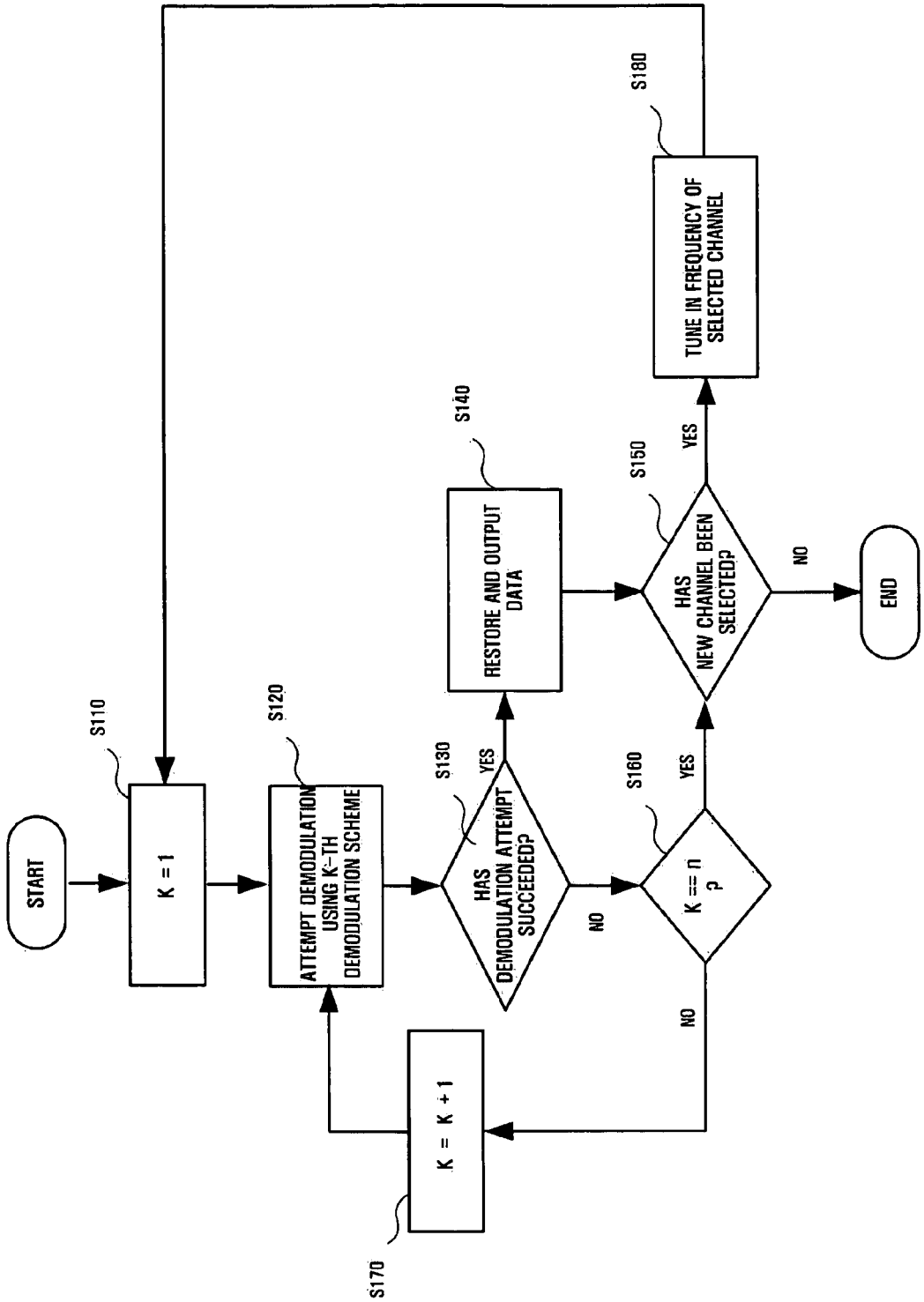
FIG. 4 is a flowchart of a sequential switching method according to an exemplary embodiment of the present invention.

FIG. 4 is a flowchart of a sequential switching method according to an exemplary embodiment of the present invention. Here, it is assumed that when there are n demodulation schemes supported by the digital broadcast receiver 100, an index K having a value of 1 through n is allocated to each of the n demodulation schemes. For example, if the digital broadcast receiver 100 supports five demodulation schemes, QAM64, QAM256, QAM1024, VSB-8, and VSB-16, indexes of 1 through 5 may be allocated to the five demodulation schemes in the above stated order or in different order. The index K may be randomly allocated to each of the demodulation schemes. This allocation of the index K is performed in the sequential switching method and all of other switching methods described below. This index K may be referred to as a "sequential index".

To select an appropriate demodulation scheme for a signal that the signal receiving unit 10 receives through a new channel, the index K is initially set to 1 in operation S110.

Figure 6:
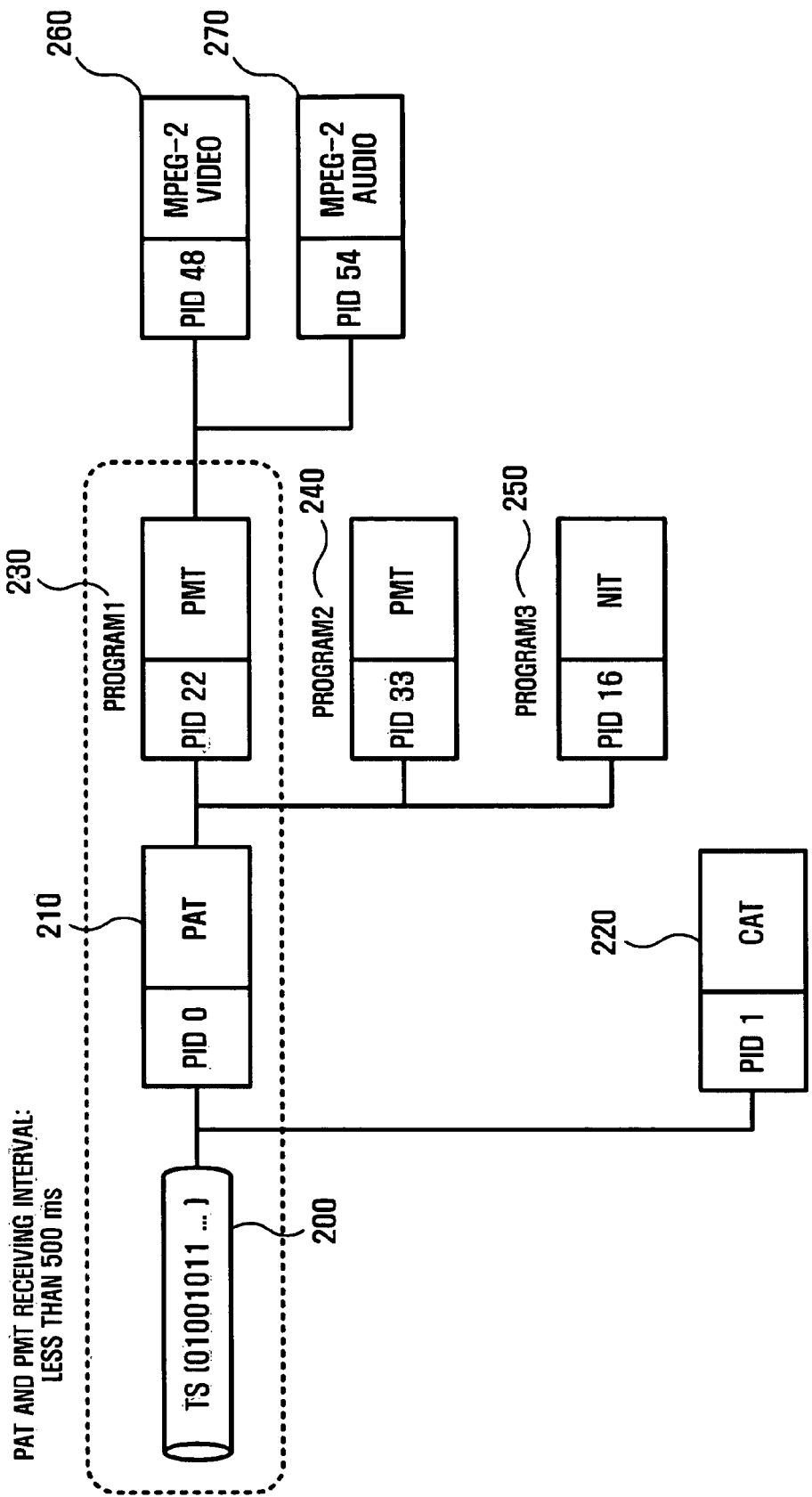
FIG. 6 is a diagram of the configuration of a transport stream.

Next, in operation S120, the demodulation control unit 80 controls the digital demodulation unit 20 to attempt demodulation using a K-th demodulation scheme. Since the index K is set to 1, the first demodulation scheme is attempted. In operation S130, the demodulation control unit 80 determines based on feedback of an output from the digital demodulation unit 20 whether the demodulation has been performed successfully. Although there may be diverse methods that can be used to determine whether the demodulation has been performed successfully, it is preferable to use a simple method providing a result quickly. In exemplary embodiments of the present invention, success or failure of demodulation is determined based on whether a program association table (PAT)

can be found within a predetermined period of time, which will be described in detail with reference to FIG. 6 later.

If it is determined that the demodulation has been performed successfully, in operation S140 the data restoring unit 50 restores data (e.g., audio, video, and/or normal data) from the output of the digital demodulation unit 20 and outputs the data.

If a user selects a new channel in operation S150, a frequency of the selected channel is tuned in operation S180 and the method returns to operation S110.

If it is determined that the demodulation has not been performed successfully, in operation S160 it is determined whether K is equal to n, that is, whether the last demodulation scheme has been performed. If it is determined that K is equal to n, there is no signal that the digital broadcast receiver 100 can demodulate at a current channel, and therefore, the method goes to operation S150.

If it is determined that K is not equal to n, there remains a demodulation scheme to be attempted. Thus, K is increased by one in operation S170, and the method returns to operation S120.

Figure 5:
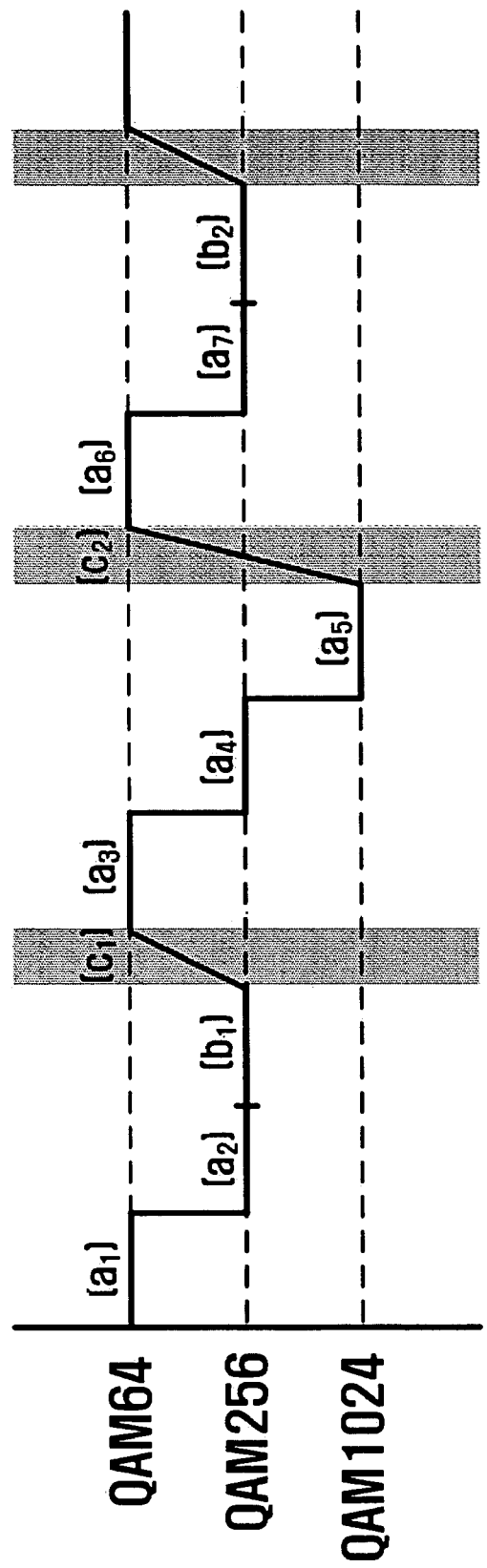
FIG. 5 is a diagram for explaining the sequential switching method in a specified example.

The sequential switching method will be described in detail by explaining a specified example with reference to FIG. 5. Hereinafter, it is assumed that the digital broadcast receiver 100 supports three demodulation schemes: QAM64, QAM256, and QAM1024, and values of 1 through 3 are allocated as the index K to QAM64, QAM256, and QAM1024, respectively. Referring to FIG. 5, with respect to an initial channel, demodulation is attempted using QAM64 having the index K of 1 in section ($a_1$), but the attempt ends in failure. Next, demodulation is attempted using QAM256 having the index K of 2 in section ($a_2$), and this attempt succeeds. Then, data is restored in section ($b_1$).

If the channel changes in section ($c_1$), demodulation is attempted sequentially using QAM64, QAM256, and QAM1024 in sections ($a_3$), ($a_4$), and ($a_5$), but all of the attempts end in failure. If the channel changes again in section ($c_2$), demodulation is attempted sequentially using QAM64 and QAM256 in sections ($a_6$) and ($a_7$) according to the index K since the demodulation attempt using QAM64 in section ($a_6$) ends in failure. Since the demodulation attempt using QAM256 ($a_7$) has succeeded, data is restored in section ($b_2$).

Meanwhile, success or failure of a demodulation attempt can be determined based on whether desired data is received within a predetermined period of time. In exemplary embodiments of the present invention, a PAT included in a transport stream (TS) is used. FIG. 6 is a schematic diagram of the configuration of a TS 30 used as a protocol in digital broadcast.

The TS 30 includes a transport packet having a fixed length of 188 bytes. The transport packet includes a 4-byte packet header and a 184-byte data area. The packet header includes 8-bit sync information at the beginning and information such as a packet identifier (PID) having a 13-bit binary value.

Such transport packet may include a video packet 260 (e.g., an MPEG-2 video packet), an audio packet 270 (e.g., an MPEG-2 audio packet), and a program specific information (PSI) data packet indicating a program specification. The PSI data packet includes a PAT packet 210 and program map table (PMT) packets 230 and 240 and a network information table (NIT) packet 250, which correspond to a program1, a program2, and a program3, respectively. If restricted reception is required, for example, for paid broadcast services, a conditional access table (CAT) 220 packet may be used. A unique PID is allocated to each of the packets to identify a type of data separately stored in the data area of each packet. However, a PID of the PAT packet 210 is fixed to 0.

Each of the PAT packet 210 and the PMT packets 230 and 240 stores information regarding a program, which is different according to a channel. However, the NIT packet 250 stores a program number and a channel number with respect to a program broadcast through a current channel and programs broadcast through all other serviced channels.

Even through all other transport packets are received, if the PAT packet 210 and the PMT packets 230 and 240 for the current channel are not received, a normal operation is impossible. To overcome this problem, the PAT packet 210 and the PMT packets 230 and 240 are usually received at a predetermined time interval of less than 500 ms. With respect to a single channel, the PAT packet 210 is one while the PMT packets 230 and 240 may be plural. Accordingly, in exemplary embodiments of the present invention, the digital demodulation unit 20 attempts demodulation and if the demodulation control unit 80 cannot read the PAT packet 210 from the result of the attempt within 500 ms, the demodulation is determined as failure. If the demodulation control unit 80 can read the PAT packet 210 within 500 ms, the demodulation is determined as success. Using the PAT packet 210 is just an example, and it will be understood that other methods can be used to determine success or failure of demodulation. In addition, a threshold time is set to 500 ms in the above explanation, but it can also be changed in actual design.

"Sequential-after-the Latest" Switching Method

Figure 7:
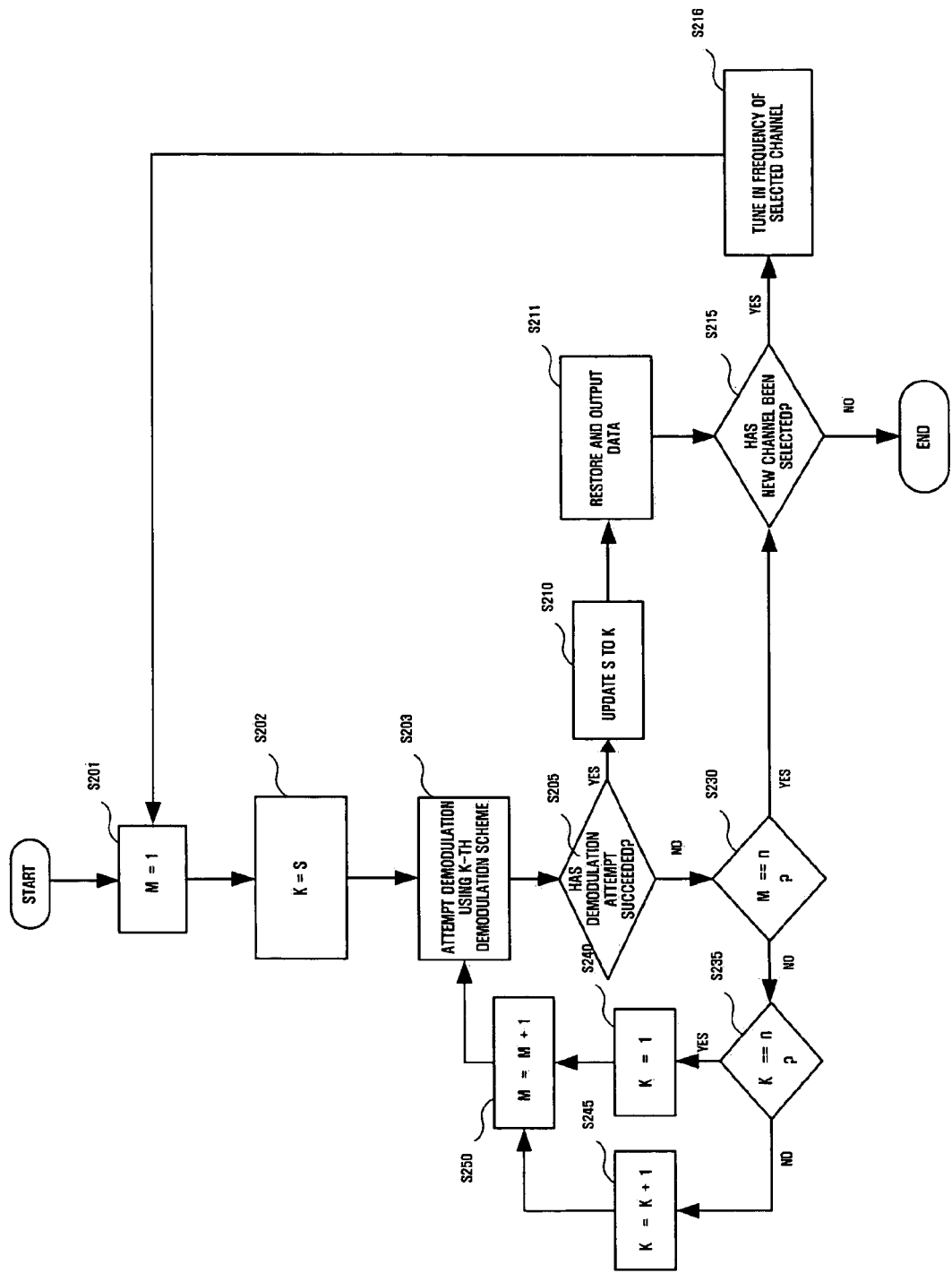
FIG. 7 is a flowchart of a "sequential-after-the latest" switching method according to an exemplary embodiment of the present invention.

FIG. 7 is a flowchart of a "sequential-after-the latest" switching method according to an exemplary embodiment of the present invention. In operation S201, the demodulation control unit 80 initially sets an index M to 1. The index M indicates the number of demodulation attempts. If all of supported demodulation schemes have been attempted, the index M is equal to n. In operation S202, the index K is set to a variable S stored in the storage unit 70.

Next, in operation S203, the demodulation control unit 80 controls the digital demodulation unit 20 to attempt demodulation using a K-th demodulation scheme. Since the index K is initially set to 1, the first demodulation scheme is attempted.

In operation S205, the demodulation control unit 80 determines based on feedback of an output from the digital demodulation unit 20 whether the demodulation has been performed successfully. If the demodulation is determined as success, in operation S210 the demodulation control unit 80 updates the variable S to the value of the index K corresponding to the successful demodulation and stores the updated variable S in the storage unit 70. Here, the index S is a variable indicating the index K allocated to a latest successful demodulation scheme. In operation S211, the data restoring unit 50 restores data (e.g., audio, video, and/or normal data) from the output of the digital demodulation unit 20 and outputs the data.

Thereafter, if a user selects a new channel in operation S215, the signal receiving unit 10 tunes in a frequency of the selected channel in operation S216 and the method returns to operation S201.

If the demodulation is determined as failure, it is determined whether the index M is equal to n in operation S230. If it is determined that the index M is equal to n, none of attempts of all demodulation schemes has succeeded. Accordingly, a current channel is recognized as null and the method goes to operation S215. If it is determined that the index M is not equal to n, it is determined whether the index K is equal to n in operation S235.

If it is determined that the index K is equal to n, it is supposed that a demodulation scheme subsequent to the last demodulation scheme in a sequential cycle, i.e., the first demodulation scheme is used in modulation attempt. Accordingly, the demodulation control unit 80 sets the index K to 1 in operation S240 and increases the index M by one in operation S250. If it is determined that the index K is not equal to n, the index K is increased by one in operation S245 and the method goes to operation S250. After operation S250, the method returns to operation S203.

Figure 8:
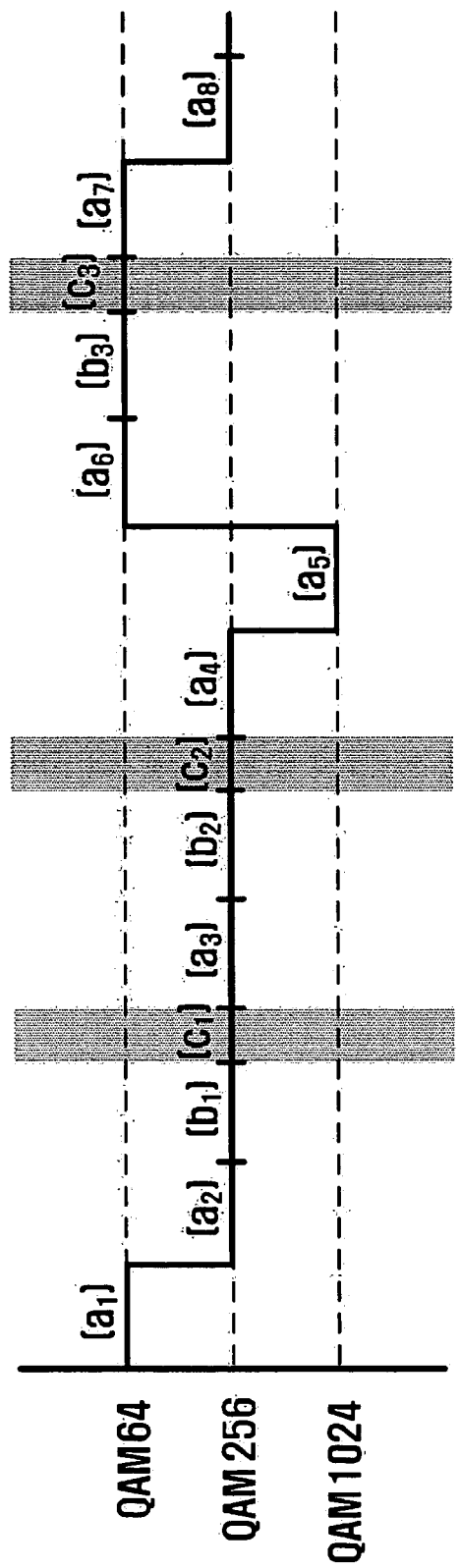
FIG. 8 is a diagram for explaining the "sequential-after-the latest" switching method in a specified example.

The "sequential-after-the latest" switching method will be described in detail by explaining a specified example with reference to FIG. 8. With respect to an initial channel, demodulation is attempted using QAM64 having the index K of 1 in section ($a_1$), but the attempt ends in failure. Next, demodulation is attempted using QAM256 having the index K of 2 in section ($a_2$), and this attempt succeeds. Then, data is restored in section ($b_1$).

If the channel changes in section ($c_1$), demodulation is attempted using the latest successful demodulation scheme, i.e., QAM256 (K=2), in section ($a_3$) and the attempt succeeds. Then, data is successfully restored in section ($b_2$).

If the channel changes again in section ($c_2$), demodulation is attempted using the latest successful demodulation scheme, i.e., QAM256 (K=2), in section ($a_4$) and the attempt ends in failure. Thereafter, according to the sequential order of index K, demodulation is attempted using QAM1024 (K=3) in sections ($a_5$). The attempt ends in failure, and thus demodulation is attempted using QAM64 (K=1) in section ($a_6$). The attempt succeeds, and thus data is restored in section ($b_3$).

If the channel changes once more, demodulation is attempted using the latest successful demodulation scheme, i.e., QAM64 (K=1) in section ($a_7$). The attempt ends in failure, and thus demodulation is attempted using QAM256 (K=2) subsequent to QAM64 in section ($a_8$)

"Sequential-after-Maximum" Switching Method

Figure 9:
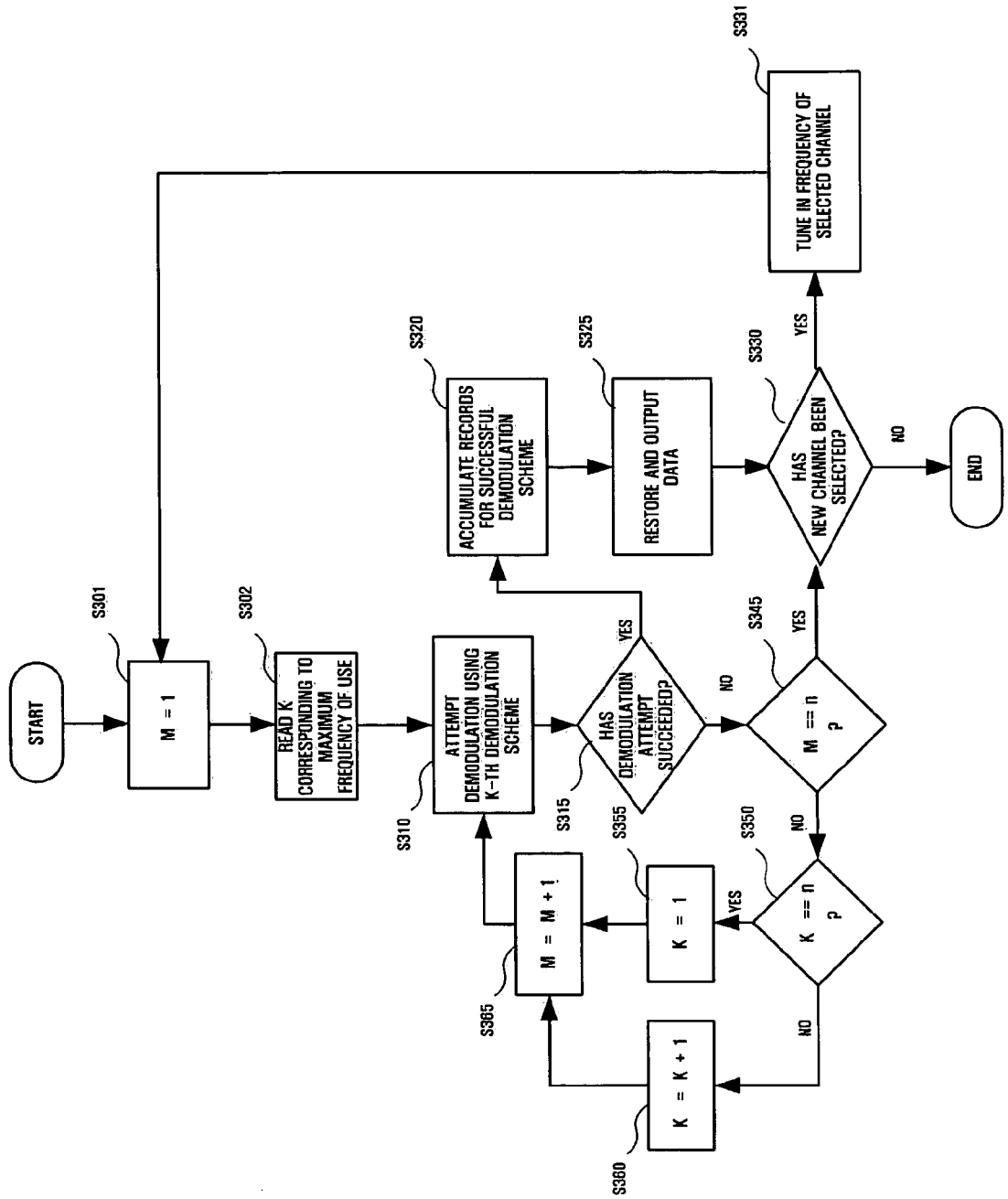
FIG. 9 is a flowchart of a "sequential-after-maximum" switching method according to an exemplary embodiment of the present invention.

FIG. 9 is a flowchart of a "sequential-after-maximum" switching method according to an exemplary embodiment of the present invention. In operation S301, the demodulation control unit 80 initially sets an index M to 1. In operation S302, the demodulation control unit 80 reads the index K corresponding to a demodulation scheme having a maximum frequency of use from the storage unit 70.

Next, in operation S310, the demodulation control unit 80 controls the digital demodulation unit 20 to attempt demodulation using a K-th demodulation scheme. In operation S315, the demodulation control unit 80 determines based on feedback of an output from the digital demodulation unit 20 whether the demodulation has been performed successfully. If the demodulation is determined as success, in operation S320 the demodulation control unit 80 accumulates records for the successful demodulation scheme. In detail, n variables from K[1] to K[n] are defined and stored in the storage unit 70 to use as counters. If demodulation attempt using a demodulation scheme having the index K of m (where m is an integer from 1 to n) succeeds for a current channel, K[m] is increased by one. In operation S325, the data restoring unit 50 restores data (e.g., audio, video, and/or normal data) from the output of the digital demodulation unit 20 and outputs the data.

Thereafter, if a user selects a new channel in operation S330, the signal receiving unit 10 tunes in a frequency of the selected channel in operation S331 and the method returns to operation S301.

If the demodulation is determined as failure, the demodulation control unit 80 determines whether the index M is equal to n in operation S345. If the index M is determined as being equal to n, none of attempts of all demodulation schemes has succeeded. Accordingly, the current channel is recognized as null and the method goes to operation S330. If the index M is determined as not being equal to n, it is determined whether the index K is equal to n in operation S350.

If it is determined that the index K is equal to n, it is supposed that a demodulation scheme subsequent to the last demodulation scheme in a sequential cycle, i.e., the first demodulation scheme is used in modulation attempt. Accordingly, the demodulation control unit 80 sets the index K to 1 in operation S355 and increases the index M by one in operation S365. If it is determined that the index K is not equal to n, the index K is increased by one in operation S360 and the index M is increased by one in operation S365. After operation S365, the method returns to operation S310.

Figure 10:
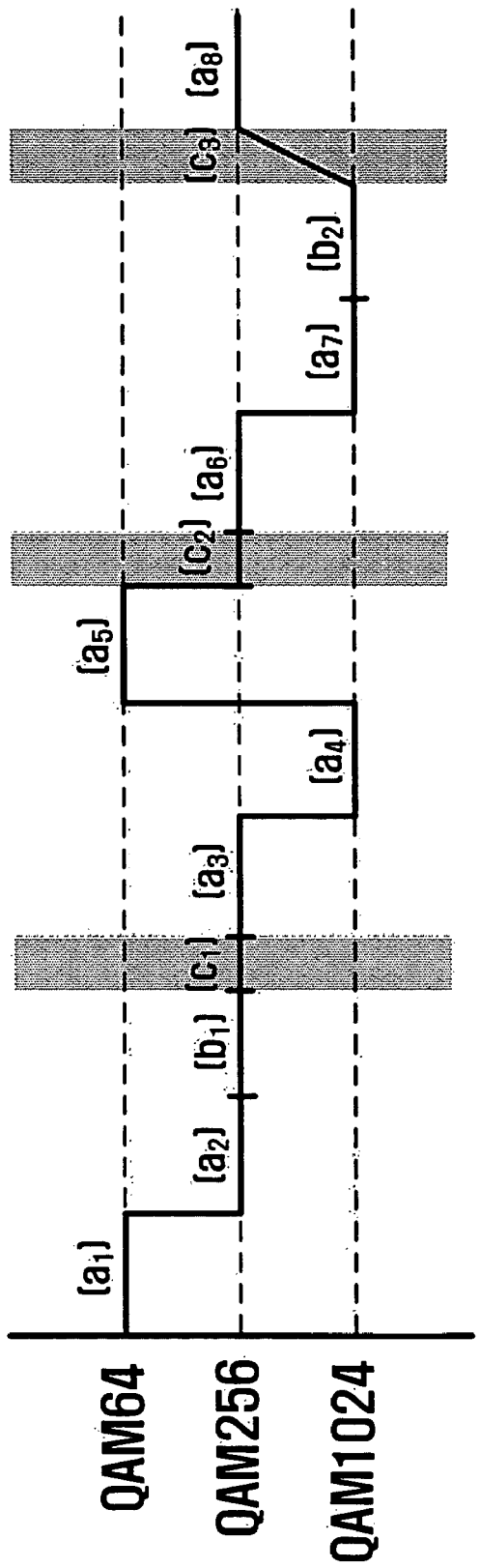
FIG. 10 is a diagram for explaining the "sequential-after-maximum" switching method in a specified example.

The "sequential-after-maximum" switching method will be described in detail by explaining a specified example with reference to FIG. 10. With respect to an initial channel, demodulation is attempted using QAM64 having the index K of 1 in section ($a_1$), but the attempt ends in failure.

Next, demodulation is attempted using QAM256 having the index K of 2 in section ($a_2$), and this attempt succeeds. Then, data is restored in section ($b_1$).

If the channel changes in section ($c_1$), demodulation is attempted using a demodulation scheme currently having a maximum frequency of use, i.e., QAM256 (K=2), in section ($a_3$). The attempt ends in failure and demodulation is attempted sequentially using QAM1024 (K=3) and QAM64 (K=1) according to the order of index K in sections ($a_3$) and ($a_4$). Every demodulation attempt using all of the supported demodulation schemes for a current channel ends in failure, and thus the current channel is recognized as null.

If the channel changes again in section ($c_2$), demodulation is attempted using a demodulation scheme having the maximum frequency of use, i.e., QAM256 (K=2) in section ($a_6$). The attempt ends in failure and thus demodulation is attempted using QAM1024 (K=3) subsequent to QAM256 according to the order of index K in section ($a_7$). The attempt succeeds and thus data is restored in section ($b_2$). Here, QAM256 and QAM1024 have the same maximum frequency of use, i.e., a frequency of 1. Any one of the demodulation schemes having the same maximum frequency of use may be used for subsequent demodulation for a newly select channel, but in this exemplary embodiment of the present invention, a demodulation scheme coming first in the order of index K among the demodulation schemes having the same maximum frequency of use is used for the newly selected channel.

Accordingly, if the channel changes once more in section ($c_3$), demodulation is attempted using QAM256 in section ($a_8$).

"Frequency Order" Switching Method

Figure 11:
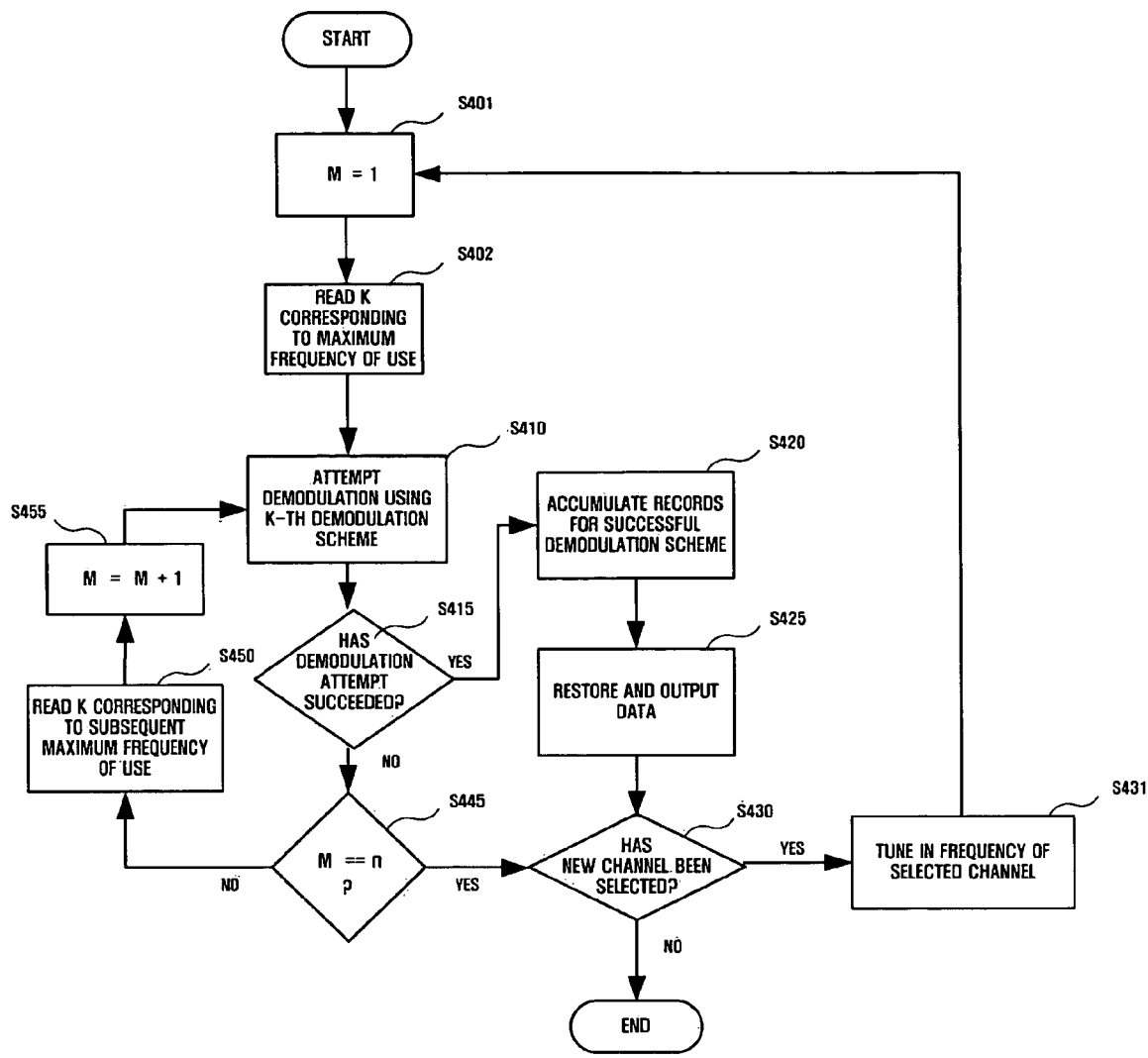
FIG. 11 is a flowchart of a "frequency order" switching method according to an exemplary embodiment of the present invention.

FIG. 11 is a flowchart of a "frequency order" switching method according to an exemplary embodiment of the present invention. In operation S401, the demodulation control unit 80 initially sets an index M to 1. In operation S402, the demodulation control unit 80 reads the index K corresponding to a demodulation scheme having a maximum frequency of use from the storage unit 70.

Next, in operation S410, the demodulation control unit 80 controls the digital demodulation unit 20 to attempt demodulation using a K-th demodulation scheme. In operation S415, the demodulation control unit 80 determines based on feedback of an output from the digital demodulation unit 20 whether the demodulation has been performed successfully. If the demodulation is determined as success, in operation S420 the demodulation control unit 80 accumulates records for the successful demodulation scheme. In operation S425, the data restoring unit 50 restores data (e.g., audio, video, and/or normal data) from the output of the digital demodulation unit 20 and outputs the data.

Thereafter, if a user selects a new channel in operation S430, the signal receiving unit 10 tunes in a frequency of the selected channel in operation S431 and the method returns to operation S401.

If the demodulation is determined as failure, the demodulation control unit 80 determines whether the index M is equal to n in operation S445. If the index M is determined as being equal to n, none of attempts of all demodulation schemes has succeeded. Accordingly, the current channel is recognized as null and the method goes to operation S430. If the index M is determined as not being equal to n, the demodulation control unit 80 reads the index K corresponding to a demodulation scheme having a subsequent maximum frequency of use from the storage unit 70 in operation S450. Next, in operation S455, the index M is increased by one and the method returns to operation S410.

The "frequency order" switching method will be described in detail by explaining a specified example with reference to FIG. 12. With respect to an initial channel, demodulation is attempted using QAM64 having the index K of 1 in section ($a_1$). The attempt succeeds and thus data is restored in section ($b_1$).

If the channel changes in section ($c_1$), demodulation is attempted using a demodulation scheme currently having a maximum frequency of use (i.e., a frequency of 1), i.e., QAM64 (K=1) in section ($a_2$). The attempt ends in failure and thus demodulation is attempted using a demodulation scheme having a subsequent maximum frequency of use (i.e., a frequency of 0), for example, QAM256 (K=2) in section ($a_3$). The attempt succeeds and thus data is restored in section ($b_2$).

If the channel changes again in section ($c_2$), demodulation is attempted using a demodulation scheme coming first in the order of index K among QAM64 (K=1) and QAM256 (K=2) that have the same maximum frequency of use in section ($a_4$), but the attempt ends in failure. Next, demodulation is attempted using QAM256 (K=2) coming subsequent to QAM64 in the order of index K among the demodulation schemes having the same maximum frequency of use in section ($a_5$) and the attempt succeeds. Then, data is restored in section ($b_3$). Here, QAM256 has the maximum frequency of use and QAM64 has the subsequent maximum frequency of use.

If the channel changes once more in section ($c_3$), demodulation is attempted sequentially using QAM256, QAM64, and QAM1024 according to a descending order of frequency of use in sections ($a_6$), ($a_7$), and ($a_8$).

As described above, according to the present invention, the digital broadcast signal is transmitted using different modulation schemes according to a physical channel, the method and apparatus enable the digital broadcast receiver to effectively select a demodulation scheme corresponding to a modulation scheme used for a received digital broadcast signal. In addition, the method and apparatus enable data of a current channel to be quickly restored if a user scans channels or wants to view a channel that has not been scanned in advance.

While this invention has been particularly shown and described with reference to exemplary embodiments thereof, the exemplary embodiments should be considered in descriptive sense only and not for purposes of limitation.

What is claimed is:

1. A method of selecting a demodulation scheme among a predetermined number of demodulation schemes supported by a digital broadcast receiver to demodulate a digital broadcast signal of a channel, the method comprising:

receiving the digital broadcast signal of the channel;

attempting demodulation of the digital broadcast signal using a demodulation scheme corresponding to a sequential index; and if the attempting demodulation is performed successfully, restoring data, and if the attempting the demodulation is not performed successfully, attempting demodulation again using a demodulation scheme corresponding to a next sequential index, wherein success or failure of demodulation is determined based on whether a program association table is read from a transport stream within a predetermined period of time.

2. The method of claim 1, wherein the sequential index is set to an initial value if the channel changes.

3. The method of claim 1, further comprising setting the next sequential index to an initial value if the sequential index is equal to the predetermined number of demodulation schemes.

4. A method of selecting a demodulation scheme among a predetermined number of demodulation schemes supported by a digital broadcast receiver to demodulate a digital broadcast signal of a channel, the method comprising:

receiving the digital broadcast signal of the channel;

attempting demodulation of the digital broadcast signal using a latest demodulation scheme performed successfully; and if the attempting demodulation is performed successfully, restoring data, and if the attempting the demodulation is not performed successfully, attempting demodulation again using a demodulation scheme corresponding to a next sequential index succeeding a sequential index allocated to the latest successful demodulation scheme, wherein success or failure of demodulation is determined based on whether a program association table is read from a transport stream within a predetermined period of time.

5. The method of claim 4, wherein the sequential index is set to an initial value if the channel changes.

6. The method of claim 4, further comprising setting the next sequential index to an initial value if the sequential index is equal to the predetermined number of demodulation schemes.

7. The method of claim 4, wherein a number of demodulation attempts is equal to or less than the predetermined number of demodulation schemes.

8. The method of claim 4, wherein the latest successful demodulation scheme is detected by reading the sequential index that is stored if the attempting the demodulation is performed successfully.

9. A method of selecting a demodulation scheme among a predetermined number of demodulation schemes supported by a digital broadcast receiver to demodulate a digital broadcast signal of a channel, the method comprising:

receiving the digital broadcast signal of the channel;

attempting demodulation of the digital broadcast signal using a demodulation scheme having a maximum frequency of use; and if the attempting the demodulation is performed successfully, restoring data, and if the attempting the demodulation is not performed successfully, attempting demodulation again using a demodulation scheme corresponding to a sequential index next to an index of the last successful demodulation scheme, wherein success or failure of demodulation is determined based on whether a program association table is read from a transport stream within a predetermined period of time.

10. The method of claim 9, wherein the sequential index is set to an initial value if the channel changes.

11. The method of claim 9, further comprising setting the sequential index to an initial value if the sequential index is equal to the predetermined number of demodulation schemes.

12. The method of claim 9, wherein a number of demodulation attempts is equal to or less than the predetermined number of demodulation schemes.

13. The method of claim 9, wherein the demodulation scheme having the maximum frequency of use is determined based on the frequency of use accumulated for each demodulation scheme that has been successfully performed.

14. The method of claim 9, the last successful demodulation scheme is detected by reading the sequential index that is stored if the attempting the demodulation is performed successfully.

15. The method of claim 9, wherein if at least two demodulation scheme have the maximum frequency of use, a demodulation scheme having a sequential index which is first among sequential indexes respectively allocated to the at least two demodulation schemes is used.

16. A method of selecting a demodulation scheme among a predetermined number of demodulation schemes supported by a digital broadcast receiver to demodulate a digital broadcast signal of a channel, the method comprising:
receiving the digital broadcast signal of the channel;
attempting demodulation of the digital broadcast signal using a demodulation scheme having a maximum frequency of use; and
if the attempting the demodulation is performed successfully, restoring data and if the attempting the demodulation is not performed successfully, attempting demodulation again using a demodulation scheme having a subsequent maximum frequency of use,
wherein success or failure of demodulation is determined based on whether a program association table is read from a transport stream within a predetermined period of time.

17. The method of claim 16, wherein a number of demodulation attempts is equal to or less than the predetermined number of demodulation schemes.

18. The method of claim 16, wherein the demodulation scheme having the maximum frequency of use is determined based on a frequency of use accumulated for each demodulation scheme that has been successfully performed.

19. The method of claim 16, wherein if at least two demodulation scheme have the maximum frequency of use, a demodulation scheme having a sequential index which is first among sequential indexes respectively allocated to the at least two demodulation schemes is used.

20. A digital broadcast receiver which selects a demodulation scheme from among a predetermined number of demodulations schemes supported by the digital broadcast receiver, performs demodulation using the selected demodulation scheme, and restores data, the digital broadcast receiver comprising:
a signal receiving unit which receives a signal selected by a user from digital broadcast signals;
a demodulation control unit which selects a demodulation scheme among the demodulation schemes supported by the digital broadcast receiver;
a digital demodulation unit which demodulates the selected signal using the selected demodulation scheme in response to control of the demodulation control unit, wherein the demodulation control unit determines whether an output signal from the digital demodulation unit has been successfully demodulated; and
a data restoring unit which restores data from the output signal from the digital demodulation unit if the output signal is determined as being successfully demodulated,
wherein success or failure of demodulation is determined based on whether a program association table is read from a transport stream within a predetermined period of time.

21. The digital broadcast receiver of claim 20, wherein the demodulation control unit selects the demodulation scheme according to a sequential order of sequential index.

22. The digital broadcast receiver of claim 20, wherein the demodulation control unit selects a latest demodulation scheme performed successfully, and if a latest demodulation scheme is not successfully performed for the selected signal, selects a demodulation scheme corresponding to a next sequential index succeeding a sequential index allocated to the latest successful demodulation scheme.

23. The digital broadcast receiver of claim 20, wherein the demodulation control unit selects a demodulation scheme having a maximum frequency of use, and if the demodulation scheme having the maximum frequency is not successful for the selected signal, selects a demodulation scheme corresponding to a sequential index next to an index of the last successful demodulation scheme.

24. The digital broadcast receiver digital broadcast receiver of claim 20, wherein the demodulation control unit selects demodulation scheme having a maximum frequency of use, and if the demodulation scheme having the maximum frequency is not successful for the selected signal, selects a demodulation scheme having a subsequent maximum frequency of use.

* * * * *